Patented Apr. 10, 1934

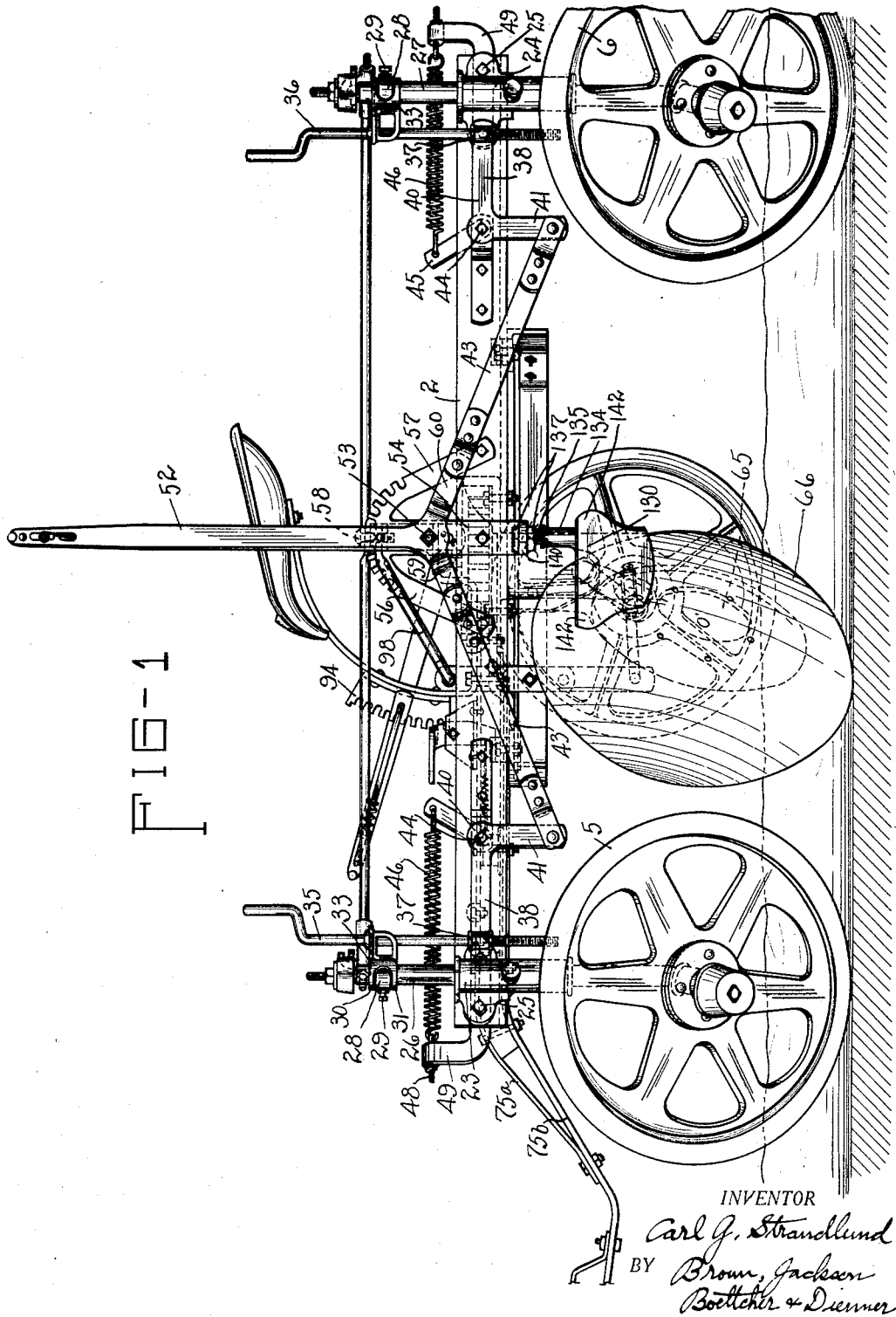

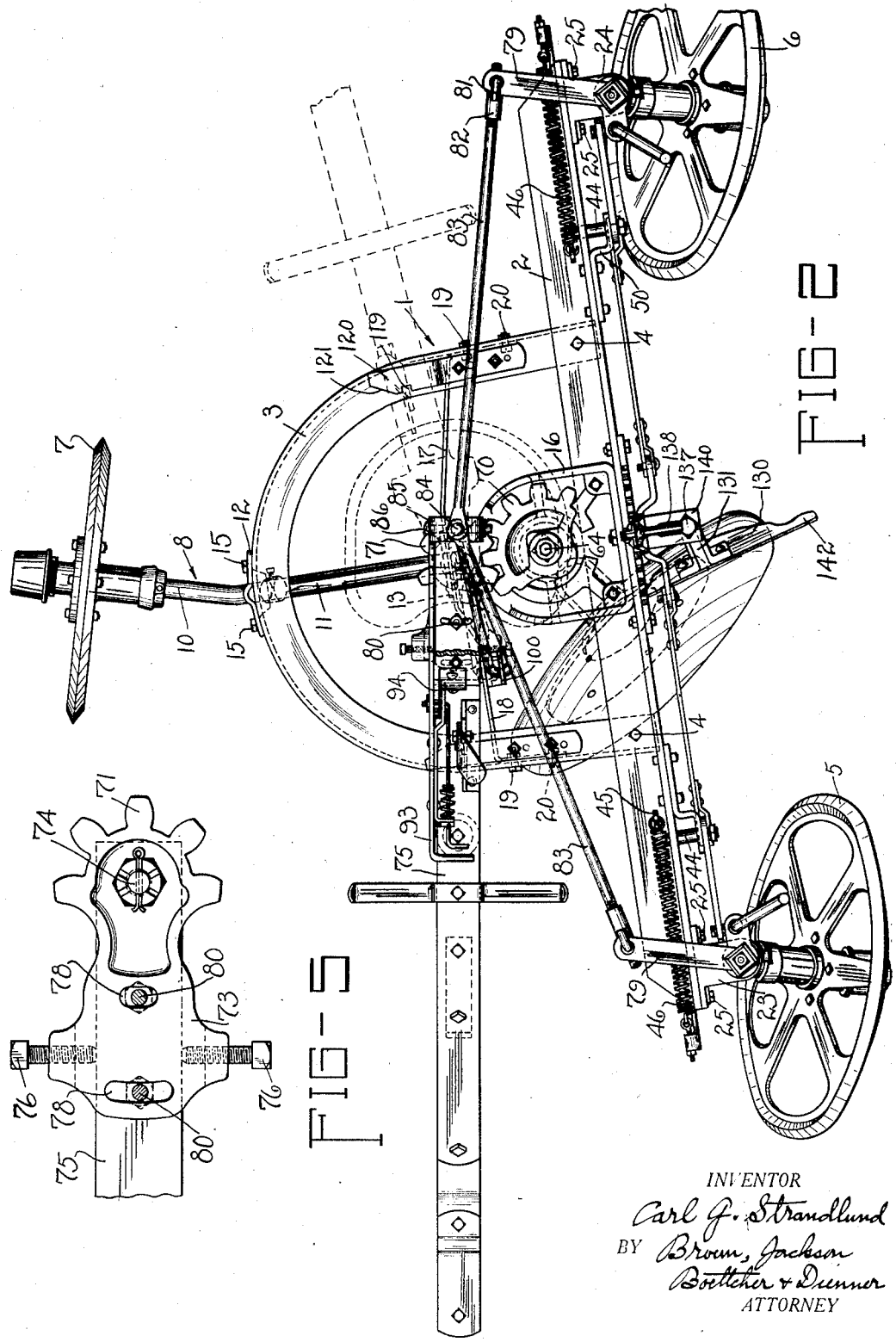

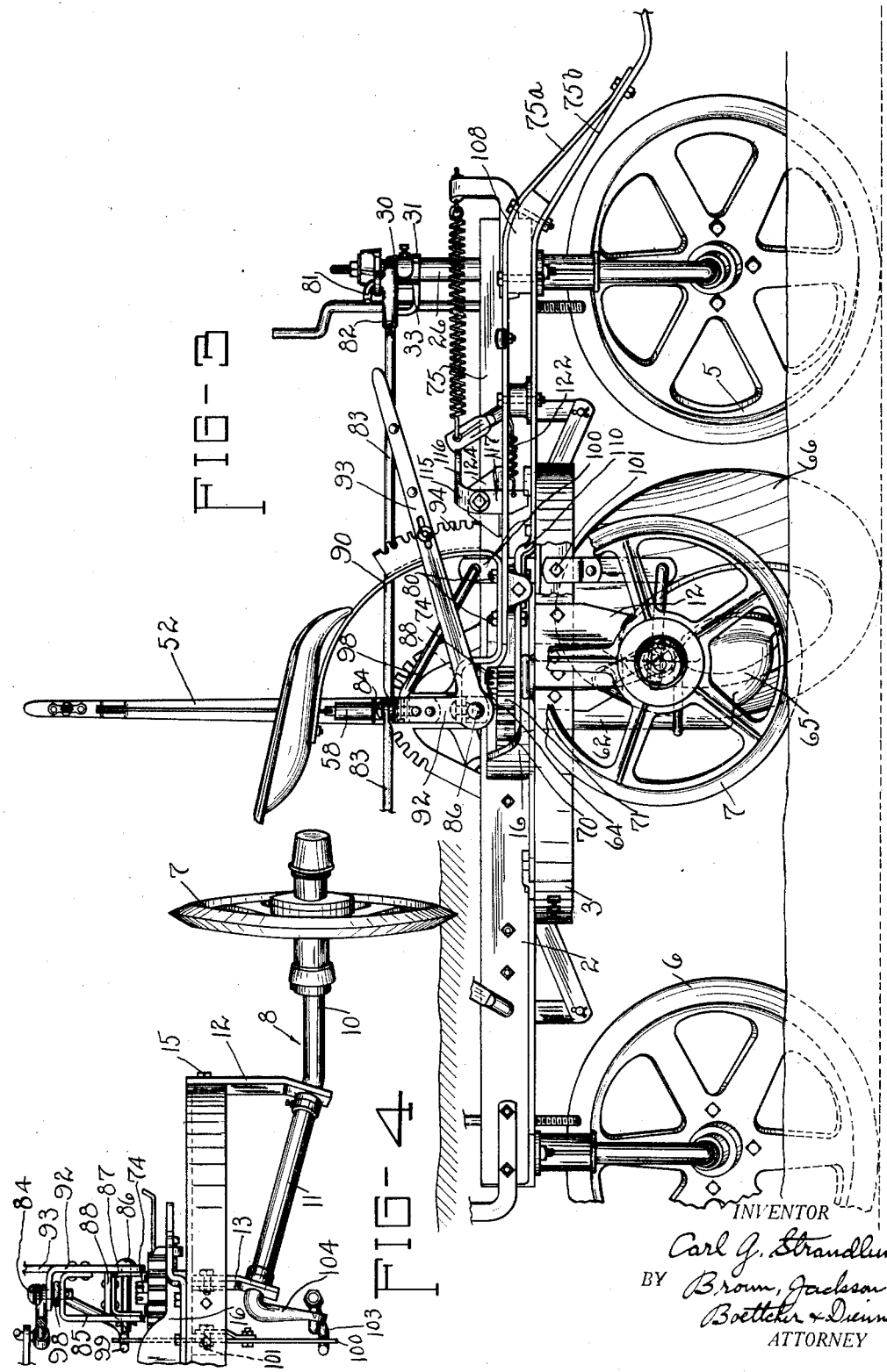

1,954,150

UNITED STATES PATENT OFFICE 1,954,150

PLOW

Carl G. Strandlund, Moline, Ill., assignor to Deere & Company, Moline, Ill., a corporation of Illinois Application August 1, 1930, Serial No. 472,239

27 Claims. (Cl. 97—32)

The present invention relates generally to wheeled plows and more particularly to that type of wheeled plow known as the reversible disc plow. In the use of this type of plow, the plow is drawn back and forth across the field, cutting furrow slices from the same side of the land at all times. When reaching the end of a furrow at one side of the field the horses or other draft source are turned around to go in the opposite direction, and the furrow opening disc is also caused to turn from one position to its alternative position, but the frame is not, however, turned end for end. One advantage of using a plow of this type is that there are no ridges or dead furrows formed during the plowing operation.

One object of the present invention is to provide, in a plow of the above described type, an improved lifting and lowering mechanism by which the frame of the plow can be raised parallel to itself. More particularly, this improvement consists of a lever arrangement which may be actuated by a forward motion on the lever, irrespective of what end of the machine the operator is facing.

Another object of the present invention is an improved means for effecting the proper adjustment of the lead of all of the plow supporting wheels, which lead is changed or shifted automatically with the turning of the team or other draft source at the end of the furrow. Generally, reversible disc plows are supported by means of two furrow wheels and one land wheel, and it is the object of the present invention to automatically adjust by positively acting means the lead of all three of these wheels when the disc is reversed at the end of the furrow.

Still further, another object of the present invention is the provision of an improved scraper for the disc and one which automatically accommodates itself to either position of the furrow opening disc. More specifically, the scraper of the present invention is so constructed and arranged that the scraper automatically reverses when the disc is reversed merely by its engagement with the disc itself. Another object of the present invention is to provide an improved means for mounting the scraper so that compensation for wear of the same may be easily effected.

Other objects and advantages of the present invention will be apparent to those skilled in the art after a consideration of the following detailed description of one preferred embodiment of the same, taken in conjunction with the accompanying drawings, in which:

Figure 1 is a vertical side elevation of one form of reversible disc plow embodying the features of the present invention;

Figure 2 is a top or plan view of the plow shown in Figure 1;

Figure 3 is a fragmentary elevation, showing certain parts broken away, showing the other side of the plow;

Figure 4 is a fragmentary elevation showing in detail the supporting and adjusting mechanism for the land wheel; and Figure 5 is an enlarged fragmentary detail view showing a part of the mechanism for reversing the position of the disc.

The plow is supported upon a frame indicated in its entirety by the reference numeral 1, and the frame 1 is seen to comprise a longitudinal member 2 and a U-shaped member 3 rigidly secured together by means, such as bolts or rivets or the like, indicated by the reference numeral 4. The frame 1 is supported on two furrow wheels 5 and 6 and a land wheel 7. The land wheel 7 is journaled upon a bent axle 8, see Figure 2, the land wheel being mounted on the angularly bent portion 10 while the straight portion 11 is journaled in brackets 12 and 13. The bracket 12 is secured, as by rivets or bolts 15, to the landward side of the U-shaped member 3 while the bracket 13 is bolted or riveted to a casting 16. The casting 16 is rigidly secured to the horizontal flange of the longitudinal member 2, preferably midway the ends thereof. Braces 17 and 18 are secured to the casting 16 by the same bolts or rivets which secure the bracket 13 to the frame member 2, and the outer ends of the braces 17 and 18 are formed with right angle extensions which lie adjacent and are secured to the vertical leg or flange of the U-shaped member 3, preferably by means of bolts 19 and 20. Preferably, the bracket 13 and the braces 17 and 18 are secured to the casting 16 by means of a downwardly extending projection 22 formed integrally with the casting 16 for this purpose.

Journal sleeve 23 and 24 are secured, as by bolts 25, to the ends of the longitudinal member 2. The furrow wheels 5 and 6 are journaled upon spindles 26 and 27, the spindles being slidable as well as rotatable in the sleeves 23 and 24. The upper ends of the spindles 26 and 27 have collars 28 secured thereto, as by set screws 29, and each of the collars 28 is received between the apertured ears 30 and 31 of a bracket 33, as best shown in Figures 1 and 3.

The vertical position of the spindles 26 and 27 in the journal sleeves 23 and 24 is controlled by means mounted on the frame in a position easily accessible from the operator's seat. As best shown in Figure 1, crank screws 35 and 36 are journaled in the brackets 33, each of which has a lower threaded end screwed into a swivel nut 37 carried at the outer end of one arm 38 of a bell crank 40. The other arm 41 of the bell crank 40 is pivotally connected to a link 43. Each of the bell cranks 40 is pivoted to the frame 1 by means of a shaft 44, one end of the latter being squared to receive the bell crank while the other end is provided with a laterally extending arm 45 which is apertured to receive one end of a balancing spring 46 the other end of which is adjustably secured, as by a bolt and nut arrangement 48, to a bracket 49 fixed to the frame member 2, preferably by means of the same bolts 25 which secure the journal sleeves 23 and 24 to the frame member 2. The shafts 44 have their journal support on the frame member 2 by means of a strap 50 at one end and an aperture in the vertical leg or flange of the longitudinal member 2 at the other end.

A raising and lowering lever 52 is pivoted at 53 to a bracket 54 secured to the vertical leg of the angle frame member 2. The bracket 54 is provided with two arms 56 and 57 which are curved and extend downwardly where they are also bolted to the vertical leg or flange of the frame member 2. The arms 56 and 57 are notched to cooperate with the usual latch mechanism 58 on the raising and lowering lever 52 to hold the lever in any of its adjusted positions. At its lower end the lever 52 is provided with two angularly related arms 59 and 60, best shown in Figure 1. These arms 59 and 60 extend in opposite directions and are inclined downwardly at a slight angle, the arm 59 being in line with one of the links 43 and the other arm 60 being in line with the other link 43. Thus by rocking the lever 52 in either direction, clockwise or counterclockwise as viewed in Figure 1, a pull will be exerted upon both of the links 43 which in turn is transmitted to the bell crank 40 to the crank screw structures 35 and 36. Since the upper ends of the crank screws 35 and 36 are secured to the brackets 33 on the furrow wheel spindles a pull on the lever 52 will be effective to raise the pivot 44 of the bell cranks 40 thus elevating the frame with respect to the spindles 26 and 27 and hence with respect to the furrow wheels 5 and 6.

The casting 16 is provided with a downwardly extending journal sleeve 62, best shown in Figures 1 and 3, and in which is journaled a disc supporting spindle 64, the latter being provided with the disc supporting casting 65, this casting rotatably supporting the disc 66 in the usual manner.

On the upper end of the spindle 64 there is a gear sector 70 nonrotatably fixed thereto. The gear sector 70 meshes with a correspondingly formed gear sector 71 formed on the end of a pole supporting casting 73. This end of the casting 73 is provided with a bolt and nut structure 74 arranged substantially on the axis of the gear sector 71. The lower end of the bolt 74 is journaled in a bearing opening in the inner end of the casting 16, the bolt 74 thus providing the pivot on the casting 16 and hence on the frame 1 about which the pole 75, secured to the pole casting 73 may swing as a center. Preferably, the pole 75 is mounted on the pole casting 73 by means affording adjustment between the pole 75 and the casting 73. As is shown in Figure 5, this securing means may take the form of a pair of adjusting screws 76 threaded into the casting 73 and extending into contact with opposite sides of the pole 74 to angularly adjust the same relative to the casting 73. Slots 78 are provided in the casting 73 and extend in the arc of a curve about the pivot bolt 74. Bolts 80 when tightened fixedly secure the pole 75 to the casting 73 in its adjusted position.

In a disc plow it is frequently necessary to give the wheels, that is, both the furrow and land wheels, a certain amount of pitch or lead in order to hold the plow up against the land. In a reversible disc plow it is necessary that this angle of lead be changed with respect to the frame each time the direction of plowing is reversed in order that the wheels may be pitched in the proper direction with respect to the new direction of travel. In the present plow this is accomplished by means of the mechanism now to be described.

Nonrotatably secured to the top of each of the spindles 26 and 27 is an arm 79 having at its outer end an aperture in which is received the hook or link member 81 having a threaded extension or sleeve 82 in which is received the threaded end of one of the links 83. At their inner ends the links 83 are pivotally connected, as by means of a bolt 84, to the top of an inverted U-shaped bracket 85. At the lower end of the arms of the U-shaped member 85 a pivot bolt 86 is provided which pivotally secures the bracket 85 to an inverted U-shaped clip 87 fixed to the underside of a bracket 88 bolted to the top of the member 73 by means of the bolts 80. The bracket 88 comprises a rearward extension of the seat support 90, being bent upwardly and then longitudinally at its seat supporting end. One of the arms of the bracket 85 comprises a separate piece 92 riveted to the bracket 85 and has an extension 93 which forms the operating lever for controlling the angle of lead or landward pitch. The lever extension 93 cooperates with a notched sector 94 secured to the seat support 90. When the lever 93 is in its lowermost position of adjustment the pivot bolt is directly over the bolt 74 the wheels 5, 6 and 7 are in planes extending parallel with the longitudinal frame member 2. However, when the lever 93 is rocked the pivot 84 is thrown away from the vertical axis defined by the bolt 74 thus rocking the arms 79 in the same direction. In Figure 2 the lever 93 has been rocked to move the pivot 84 to the right thus rotating the arms 79 and the spindles 26 and 27 in a clockwise direction giving the wheels 5 and 6 a landward lead.

It is desirable that the landward wheel 7 have its pitch changed simultaneously with the change of pitch or lead of the furrow wheels 5 and 6. In order to accomplish this a link 98 is connected to the pivot 84 and extends downwardly where its lower end has a right angle turn 99 which is received in the upper end of a swinging link 100 pivoted, as by a pivot bolt 101, to the brace member 18. The lower end of the swinging link member 100 extends downwardly and is link connected, through link 103, to an arm 104, preferably formed integrally with the straight portion 11 of the land wheel axle 8. Thus whenever the pivot bolt 84 is shifted to change the lead of the furrow wheels 5 and 6 the link 100 is rocked, turning the shaft or axle which, by virtue of the angularly bent portion 10, changes the pitch or lead of the land wheel 7 a corresponding amount.

The pole or draft member 75 may comprise two straps 75a and 75b separated by a block 108. The lower strap member 75b has sliding engagement with the lateral flange of the U-shaped frame member 3, while at 110 the lower strap 75b is offset, the offset portion extending along the under side of the casting 73 and provided with a hole in its end embracing the bolt 74.

By turning the draft member 75 from the position shown in Figure 2 clockwise to a position with respect to wheel 6 corresponding to the position it is shown in Figure 2 as occupying with respect to wheel 5, the spindle 64 is rotated by reason of the engagement of the gear sector 70 with the gear sector 71 on the draft member 75. This brings the disc 53 into a position with respect to wheel 6 which corresponds to the position it is shown in in Figure 2 with respect to wheel 5.

A latch 115 is provided to lock the draft member 75 in either of its two positions. The latch 115 comprises a bell crank having a laterally directed arm 116 and a downwardly directed arm 117, the latter being adapted to ride into engagement with a notch 119 formed on the latch bracket 120 bolted to the U-shaped frame member 3. In order to provide for automatic engagement the latch bracket 120 is provided with a sloping cam surface 121. Two of such latch brackets 120 are provided, one on each side of the U-shaped frame member 3 to engage and retain the draft member 75 in proper position. The laterally directed offset arm 116 of the latch 115 is adapted to be operated by the foot of the operator to swing the arm 117 out of engagement with the notch 119. A spring 122 normally urges the arm 117 into engagement, and the latch 115 is pivotally mounted upon a bracket 124 fixedly secured to the draft member 75.

The disc 66 is also provided with a scraper 130 which is fixed to a bracket 131. The bracket 131 is provided with a vertically positioned sleeve 134 which embraces a bolt 135, the upper end of which is held in position by means of two nuts 137 in a slot 138 provided in the laterally directed portion 140 of the bracket 54. The vertical position of the scraper may be adjusted by adjusting the nuts 137 holding the bolt 135 in place.

The scraper 130 is symmetrical about the center line of the bracket 131 and is free to rotate on the bolt 135. The scraper 130 is provided with two wings 142 which are adapted to contact with the disc when the disc is being rotated from one position to another, thus serving to automatically rotate the scraper about the bolt 135 to the proper scraping position on the opposite side of the disc. The lower central portion of the scraper is curved and is in contact with the disc 66 substantially over its entire length in both positions of the disc. The wings 142 function alternately, when the disc is being reversed to aid the scraper to take its proper position.

The operation of the improved reversible disc plow constructed according to the present invention is as follows. The plow is shown in Figure 2 as it appears when removing a furrow slice from the left of the land. When the end of the furrow is reached the horses are turned around, swinging the draft member 75 about its pivotal axis 74 on the frame. This causes the disc 66 to be reversed by virtue of the meshed gear sectors 70 and 71. As illustrated in Figure 2 the extension lever 93 is so positioned that the pivot bolt 84, to which the links 83 and 98 are connected, is spaced a certain distance in a horizontal direction from the pivot bolt 74. Thus when the draft member 75 is swung to its new position both the links 83 and 98 are displaced to the left. This causes the arms 79 to experience a counterclockwise rotation which swings the wheels 5 and 6 to their new position which will give the proper lead when the plow is drawn across the field in the opposite direction. When the link 98 is displaced by the above mentioned swinging of the frame member 75 the link 100 rotates the land wheel axle 8 to a given angular displacement which is proportioned to give the proper lead to the land wheel 7. The new position of the draft member 75 is indicated by the dotted lines in Figure 2, and after the horses have been turned to bring the draft member to this position they are then driven forward and at the same time directed to the right until one of the draft animals is walking in the furrow made on the preceding trip. When the draft member 75 reaches the position indicated in dotted lines in Figure 2 the latch 115 snaps into engagement in the notch 119 so that as the horses are directed to the right until one is walking in the furrow just made the frame 1 swings relative to the wheel 6 and substantially about the same as a center until wheel 5 runs in the furrow being opened by the disc 66 in its reversed position.

When it is desired to adjust the amount of lead the extension lever 93 is moved in one or the other direction, as is apparent from an inspection of Figures 2 and 3. Movement of the lever 93, through the connections comprising the elements 98, 100 and 103, causes a rotation of the axle 8. Due to the fact that the bent portion 10 of the axle 8 is offset with respect to the portion 11, the rotation of portion 11 causes a corresponding change in the lead of the land wheel 7. Preferably, the link connections to the land wheel 7 and the furrow wheels 5 and 6 are so proportioned that when the lever 93 is placed in its lowermost position, bringing the bolt 84 directly above the pivot bolt 74 about which the draft member 75 may be rotated, all three wheels will be in a position of parallelism with respect to the frame member 2.

Since the amount of lead is proportional to the distance that the bolt 84 is spaced from the bolt 74, as measured in a horizontal plane, it follows that the adjustment of the lever 93 is effective in varying the lead of all three wheels simultaneously. From this it also follows that when the draft member 75 is swung to one or the other of its alternative positions, the bolt 84, will be brought the same distance away from bolt 74 but on one or the other sides thereof. As a result irrespective of what position the lever 93 is in, that is, irrespective of what angle of lead the three wheels have, these wheels will all be turned to have the same angle of lead when the draft member 75 is rotated to its other position, except that the angle of lead will be in the opposite direction.

The auxiliary lever 93, being connected to all three wheels, can also function as a means for steering the plow. When the plow encounters an obstacle and is forced out of the furrow, the lever 93 may be used to steer the plow back into the furrow, thereby making it possible to bring the plow back to its work more quickly than if this had to be done solely by maneuvering of the team or tractor.

When it is desired to elevate the furrow opening disc 66 to transport position the lever 52 may be swung in either direction from its central position adjacent the operator's seat, which motion exerts a pull to links 43, thus rocking the bell cranks 40 and lifting the longitudinal frame member 2 relative to the vertical spindles 26 and 27. Since the lever 52 is always in a central and substantially vertical position when the disc is in plowing position this lever is always within convenient reach of the operator no matter whether the draft member 75 is in one or the other of its alternative positions. Furthermore, since the extension lever 93 is pivoted to move with the draft member 75 the position of this latter lever is also always within convenient reach of the operator. Furthermore, since the arms 59 and 60 are in alignment with the links 43 a given angular displacement of the lever 52 from its central position exerts a greater force in lifting the frame relative to the spindles 26 and 27 after the lever 52 has been moved an appreciable amount. Thus, where the lever 52 is rocked to a more favorable position the rate of lifting the frame is increased.

As the furrow opening disc 66 is turned from one of its positions to the other the scraper is automatically reversed, by virtue of the mounting of the same about a vertical axis and by virtue of the engagement or contact of one of the wings 142.

While I have described and illustrated in the accompanying drawings the preferred embodiment of the present invention it is to be understood that the present invention is not to be limited to the specific details shown and described but that, in fact, widely different means may be employed in the practice of the broader aspects of the invention.

What I claim, therefore, and desire to secure by Letters Patent is:

1. In a plow, in combination, a frame, supporting wheels for the frame and vertically movable relatively thereto, and means for raising and lowering the frame relatively to the supporting wheels including a lever mounted on the frame and movable in either direction from a central position for simultaneously raising both ends of the frame and including individual crank screws for each of said wheels.

2. In a plow, in combination, a frame, supporting wheels for the frame movable vertically relative thereto, and means for simultaneously raising and lowering both ends of the frame relative to two of the wheels comprising a lever movable in a plurality of directions for raising the frame.

3. In a disc plow, a frame, a raising and lowering lever pivoted centrally of the frame, journal sleeves on the frame, supporting wheels having spindles slidably received in the sleeves, crank means pivoted to the frame, and operative to control the vertical position of said spindles, said raising and lowering lever provided with rigid extensions, and links aligned with the extensions and connecting the same with the crank means so that the lever may be rocked in either direction from an intermediate position to actuate the crank means.

4. In a disc plow, a frame, a raising and lowering lever pivoted centrally of the frame, journal sleeves on the frame, supporting wheels having spindles slidably received in the sleeves, crank means pivoted to the frame, manually adjustable connections between said crank means and the spindles whereby rocking of the crank means raises and lowers the frame relative to the spindle, a pair of oppositely directed extensions on the raising and lowering lever, and links aligned with the extensions and connecting the same with the crank means so that the lever may be rocked in either direction from an intermediate position to actuate the crank means.

5. A reversible disc plow comprising, in combination, a supporting frame, a disc pivoted to the frame, a draft member adapted to be moved from a forward position to a reversed position and to adjust said disc, a plurality of furrow wheels for the frame adjustably mounted thereon, and means to adjust the frame relative to said wheels including a lever mounted on the frame and adapted to be moved from a central position in either direction to position said frame, said frame being in substantially lowermost position relative to said wheels when said lever is in the central position whereby movement of said lever in either direction from said central position raises said frame relative to the wheels.

6. In a reversible disc plow, the combination of a wheeled frame having furrow and land wheels, said wheels being adapted for movement to shift the lead, a draft member adapted to occupy reverse positions and having a fixed pivotal mounting on said frame, and means connected with the draft member and actuated thereby for shifting the lead of all the wheels in accordance with the position of said draft member, said means comprising link means connected to all of said wheels.

7. In a reversible disc plow, the combination of a wheeled frame having furrow and land wheels, said wheels being adapted for movement to shift the lead, a draft member adapted to occupy reverse positions and having a fixed pivotal mounting on said frame, and means for shifting the lead of all the wheels in accordance with the position of the draft member, said means comprising link means extending from a single point on said member and connected to all of said wheels.

8. In a reversible disc plow, the combination of a wheeled frame having furrow and land wheels adapted to be shifted relative to the frame to shift the lead of the wheels, a draft member adapted to occupy reverse positions and having a fixed pivotal mounting on said frame, means for shifting the lead of all the wheels in accordance with the position of the draft member, said means comprising link means extending from a single point on said member and connected to all of said wheels, and manually operable means for shifting said point relative to the point of pivotal connection between the draft member and the frame.

9. In a plow, the combination of a frame, supporting wheels therefor including front and rear supporting wheels and a land wheel, said wheels being adapted for movement to shift the lead thereof, and means mounted substantially centrally of the frame and manually movable fore and aft for simultaneously adjusting the lead of all of said wheels.

10. In a reversible disc plow having a frame with supporting wheels and a land wheel, a bent axle, one of said wheels being mounted on the angularly bent portion of said axle, the straight portion being mounted for rotation on the frame, means connecting said supporting wheels with said frame for relative movement, a draft member and seat pivoted to the frame at a fixed point thereon to occupy a forward and a reversed position, the combination of means actuated by the relative movement of said member and frame for simultaneously adjusting said wheels, the adjustment of the wheel on the bent axle taking place by rotation of the straight portion of said axle by said means.

11. In a reversible disc plow having a frame with supporting wheels mounted on the frame for movement relative thereto, a draft member and seat pivoted to the frame at a fixed point thereon to occupy a forward and a reversed position, the combination of means actuated by the relative movement of said member and frame for simultaneously adjusting said wheels, and manually operable means carried by said draft means adjacent the seat for effecting different degrees of adjustment of the supporting wheels by said relative movement.

12. In a reversible disc plow having a frame with supporting wheels shiftably mounted thereon for movement relative thereto, a draft member and seat pivoted to the frame at a fixed point thereon to occupy a forward and a reversed position, the combination of means actuated by the relative movement of said member and frame for simultaneously adjusting said wheels, said means comprising links secured to the draft member and extending for connection with said wheels, said links being secured to the member by means of a shiftable bracket adapted to occupy a position spaced from said fixed pivot point.

13. In a reversible disc plow having a frame with supporting wheels shiftably mounted thereon for movement relative thereto, a draft member and seat pivoted to the frame at a fixed point thereon to occupy a forward and a reversed position, the combination of means actuated by the relative movement of said member and frame for simultaneously adjusting said wheels, said means comprising links secured to the draft member and extending for connection with said wheels, said links being secured to the member by means of a shiftable bracket adapted to occupy a position spaced from said fixed pivot point, and manually operable means for adjusting the position of said bracket.

14. In a reversible plow having a frame, land and furrow wheels therefor shiftably mounted on said frame for movement relative thereto, a bent axle, one of said wheels being mounted on the bent portion of said axle, the straight portion of said axle being rotatably held in fixed brackets on the frame, a shiftable disc, and a reversible draft member, the combination of means controlled by said member for automatically adjusting the position of said wheels and disc when the plow is moved in the opposite direction, said means effecting adjustment of the wheel on the bent axle by rotating said axle.

15. In a reversible disc plow having a frame, the combination of a disc, a scraper for the disc mounted on the frame for movement about a vertical axis and so shaped that it will be automatically reversed when the disc is reversed and means for mounting the scraper on the frame adapted to position the scraper in a number of vertically adjusted positions relative to the disc.

16. In a reversible disc plow having a frame, the combination of a disc, a bracket on the frame having a transverse slot in line with the pivotal axis of the disc, and a scraper for the disc having a vertical journal adjustably secured in said slot, the scraper having curved edges and laterally extending wings so shaped that it will be automatically reversed when the disc is reversed.

17. In a plow the combination with a reversible furrow opener, of a pivotally mounted scraper comprising a central disk-contacting portion and oppositely extending members, one of which is arranged to coact with the furrow opener when the furrow opener moves from one position and the other being arranged to coact with the furrow opener when the opener moves from its other position, both of said members being out of contact with said furrow opener in each of said positions.

18. A reversible disc plow comprising, in combination, a fore and aft extending frame, journal sleeves mounted on said frame near the ends thereof, supporting wheels for the frame including spindles slidable in said sleeves, bell cranks pivoted on the frame, each having one arm connected with one of the spindles, means for adjusting said connection, a raising and lowering lever pivoted to the frame substantially centrally thereof, fore and aft extensions on said member, links extending in aligned relation with said extensions and connected with the other arm of each bell crank so that when the lever is rocked in either direction a pull is exerted on the bell cranks by said links, a land wheel axle having a lateral bend journaled on the frame, a land wheel thereon, a draft member pivoted to the frame, a furrow opening disc, means journaling the disc on the frame, means actuated by the pivotal movement of said draft member for rotating said land wheel axle and for shifting the spindles whereby the lead of said wheels is changed, and means to lock the draft member in its different positions.

19. A reversible wheeled disc plow comprising a frame, vertically and angularly adjustable wheels for the frame, a disc, a reversible draft member pivotally connected with the frame, an operator's seat movable with said reversible member, a lever mounted on the frame and adapted to adjust the vertical position of said wheels, said lever being mounted adjacent the operator's seat in either of its positions and being adapted to raise the frame relative to the wheels when moved forwardly from the seat when the latter occupies either of its positions, an angularly adjustable land wheel, and means responsive to the movement of said draft member for shifting the lead of all of said angularly adjustable wheels.

20. In a plow, in combination, a frame, vertically shiftable supporting furrow wheels for the frame, individual adjusting means for each wheel, and movable means for simultaneously raising and lowering both ends of the frame parallel to itself and relatively to the supporting wheels, said movable means including double acting lever means connected with said individual means and operable when actuated to either side of a neutral position to raise said frame.

21. A reversible disc plow comprising, in combination, a fore and aft extending frame, journal sleeves mounted on said frame near the ends thereof, furrow wheels and a land wheel for said frame, said furrow wheels having spindles slidably mounted in said sleeves, bell cranks pivoted on the frame and each having one arm connected with one of said spindles, a land wheel axle having a lateral bend being journaled on the frame and having the land wheel thereon, a raising and lowering lever pivoted to the frame substantially centrally thereof and connected with the other arm of each bell crank so that when the lever is rocked the frame is shifted relative to said spindles, a draft member pivoted to the frame for movement into different positions, a furrow opening disc, means journaling the disc for rotation into two positions on the frame, means actuated by the pivotal movement of said draft member for rotating said land wheel axle and said spindles whereby the lead of all of said wheels is changed, means actuated by the pivotal movement of the draft member for effecting rotation of said disc, a pivotally mounted scraper contacting the disc and including opposite side members, one of said side members is arranged to contact with the disc in one position of the disc and the other of said side members is arranged to coact with the disc when the disc is in its other position, one of said side members of the scraper being out of contact with the disc when the disc is in either of its positions, pivotal movement of the scraper being effected by the disc when the disc is pivoted as a result of movement of the draft member, and means to lock the draft member in its different positions.

22. In a plow, the combination of a wheeled frame having a plow and furrow and land wheels, said wheels being adapted for movement to shift the lead thereof, a draft member adapted to occupy different positions and having a fixed pivotal mounting on said frame, and means connected with said draft member for shifting the lead of all of the wheels in accordance with the position of the draft member and actuated by said member, said means including connections with all of said wheels and lever and sector means, said lever and sector means being operable through said connections with all of the wheels to effect steering of the plow back into the furrow when the plow encounters an obstacle and is forced out the furrow without necessitating changing the position of the draft member.

23. In a plow, the combination of a wheeled frame having a plow and furrow and land wheels, said wheels being adapted for movement to shift the lead, a draft member adapted to occupy reverse positions and having a fixed pivotal mounting on the frame, and means conected with said draft member and actuated thereby for shifting the lead of all of the wheels in accordance with the position of said member, said means comprising connections with all of said wheels and manually operable lever means, said lever means being operable to effect steering of the plow independent of the position of the draft member.

24. A reversible wheel disc plow comprising a frame, vertically and angularly adjustable wheels for the frame, a reversible draft member pivotally connected with the frame, an operator's seat movable with said reversible member, a lever mounted on the frame and adapted to adjust the vertical position of said wheels, said lever being mounted adjacent the operator's seat in either of its positions, an angularly adjustable land wheel, and means responsive to the movement of said draft member for shifting the lead of all of said angularly adjustable wheels.

25. A reversible wheeled disc plow comprising a frame, vertically and angularly adjustable wheels for the frame, said wheels being mounted in vertical spindles, a reversible disc journaled in the frame, a reversible draft member pivotally connected with the frame and geared to said disc, connections between said reversible draft member and said wheels to angularly shift the wheels simultaneously with the reversal of said draft member, an adjusting lever mounted centrally on said frame, and connections between said wheels and said lever whereby operation of said lever raises and lowers the frame relative to said wheels, said last named connections comprising swinging links and rotatable non-slidable connections between the links and said spindles.

26. In a plow, the combination of a frame, supporting wheels therefor including front and rear supporting wheels and a land wheel, means shiftably connecting said wheels with said frame, and a single means mounted substantially centrally of the frame and movable in a general fore and aft direction for simultaneously adjusting the lead of all of said wheels.

27. A reversible disk plow comprising, in combination, a supporting frame, a pair of furrow wheels mounted on the frame for movement about vertical axes, a draft member connected with said frame and movable relatively thereto, and means connected between said furrow wheels and directly connected with said draft member to move directly therewith for swinging said wheels to steer the plow.

CARL G. STRANDLUND.